Figure 1:
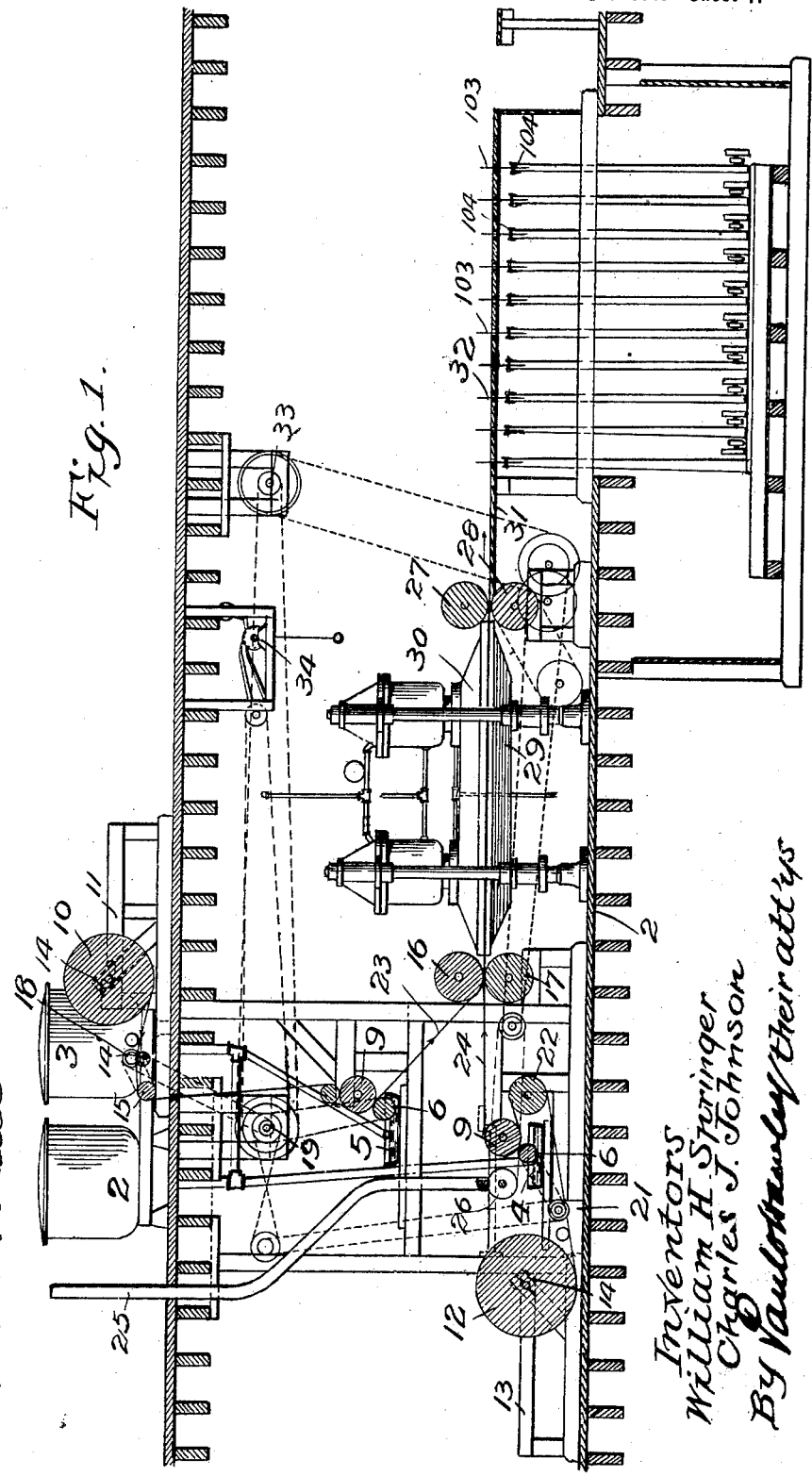

No. 679,698. Patented July 30, 1901.
C. J. JOHNSON & W. H. SPRINGER.
MACHINE FOR MANUFACTURING COMPO-BOARD.
(Application filed Oct. 22, 1897.)
(No Model.) 8 Sheets—Sheet 1.

No. 679,698. Patented July 30, 1901.
C. J. JOHNSON & W. H. SPRINGER.
MACHINE FOR MANUFACTURING COMPO-BOARD.
(Application filed Oct. 22, 1897.)
(No Model.) 8 Sheets—Sheet 2.

Witnesses:
C. E. Van Dorn
Richard Paul

Inventors:
William H. Springer
Charles J. Johnson
By Vaulé Hawley their attys

No. 679,698. Patented July 30, 1901.
C. J. JOHNSON & W. H. SPRINGER.
MACHINE FOR MANUFACTURING COMPO-BOARD.
(Application filed Oct. 22, 1897.)
(No Model.) 8 Sheets—Sheet 4.
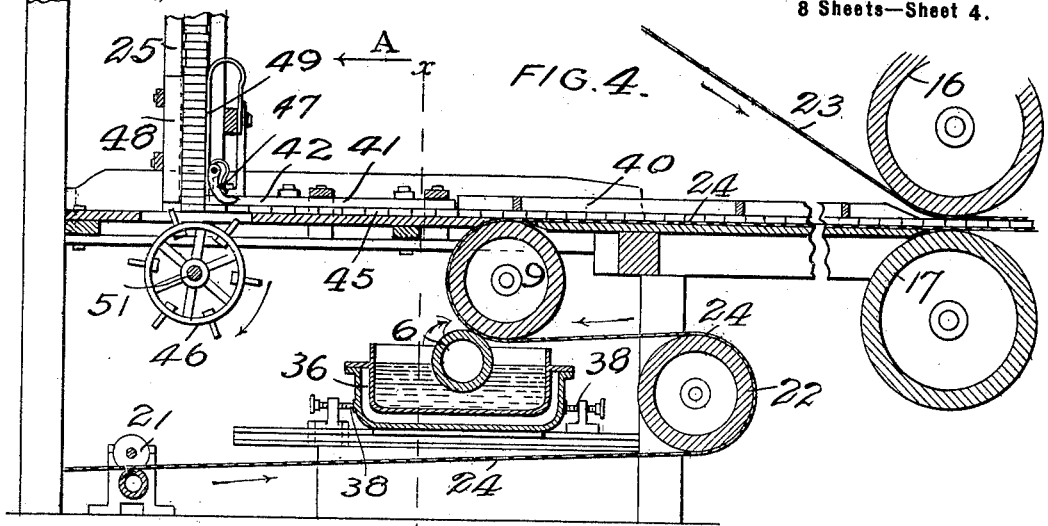
FIG. 4.
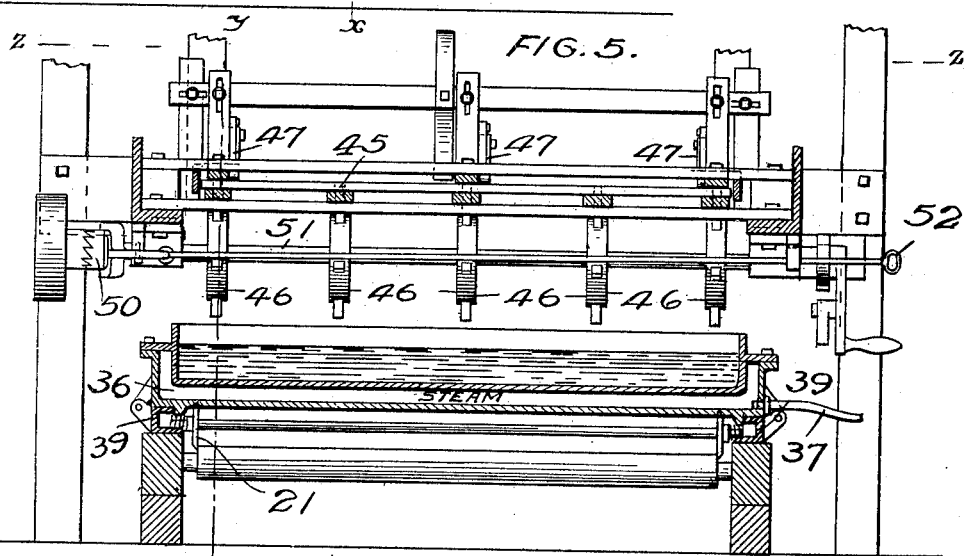
FIG. 5.
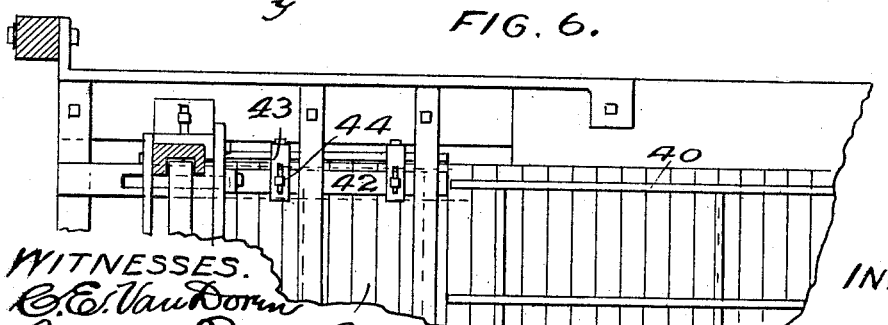
FIG. 6.
FIG. 7.
WITNESSES.
C. E. Van Dorn
Richard Paul
INVENTORs
William H. Springer
Charles J. Johnson
By Paul O. Hawley
their att'ys
THE NORRIS PETERS CO., PHOTO-LITHO., WASHINGTON, D. C.

No. 679,698. Patented July 30, 1901.
C. J. JOHNSON & W. H. SPRINGER.
MACHINE FOR MANUFACTURING COMPO-BOARD.
(Application filed Oct. 22, 1897.)
(No Model.) 8 Sheets—Sheet 5.

WITNESSES.
INVENTORS
William H. Springer
Charles J. Johnson
By Paul Hawley
their att'ys.

No. 679,698. Patented July 30, 1901.
C. J. JOHNSON & W. H. SPRINGER.
MACHINE FOR MANUFACTURING COMPO-BOARD.
(Application filed Oct. 22, 1897.)
(No Model.) 8 Sheets—Sheet 6.
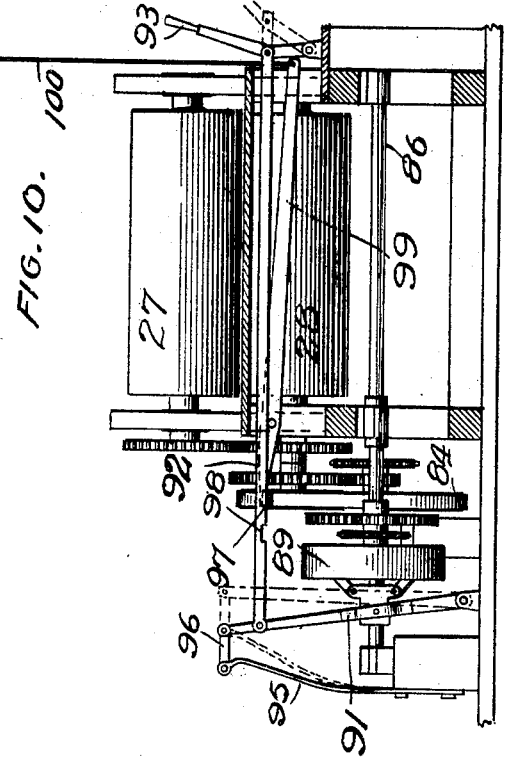
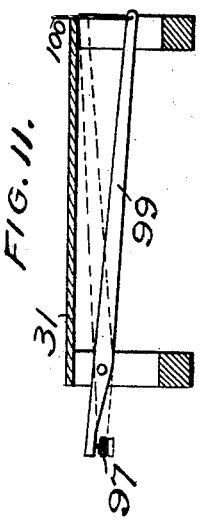
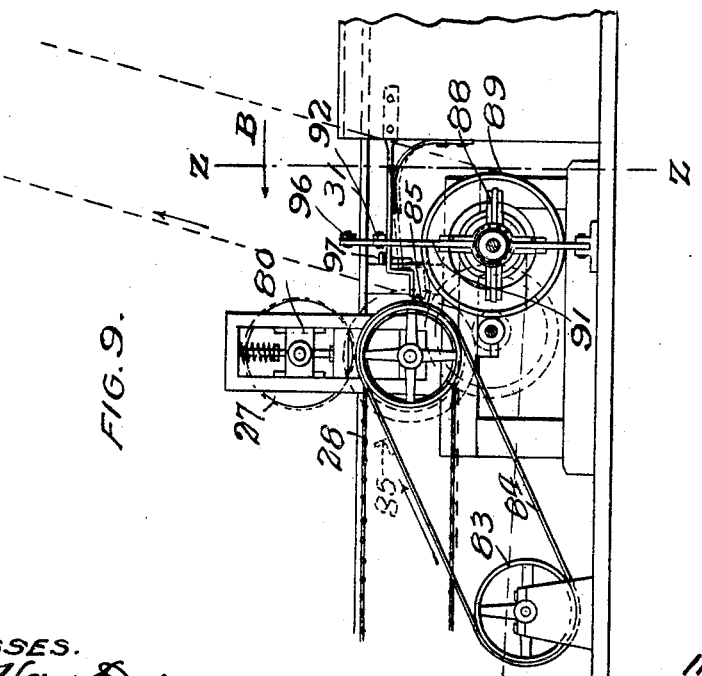
WITNESSES.
INVENTORS
William H. Springer
Charles J. Johnson
By Paul O Hawley their att'ys No. 679,698. Patented July 30, 1901.
C. J. JOHNSON & W. H. SPRINGER.
MACHINE FOR MANUFACTURING COMPO-BOARD.
(Application filed Oct. 22, 1897.)
(No Model.) 8 Sheets—Sheet 7.

WITNESSES.
INVENTORS
William H. Springer
Charles J. Johnson
By Paul Hawley
their attorneys.

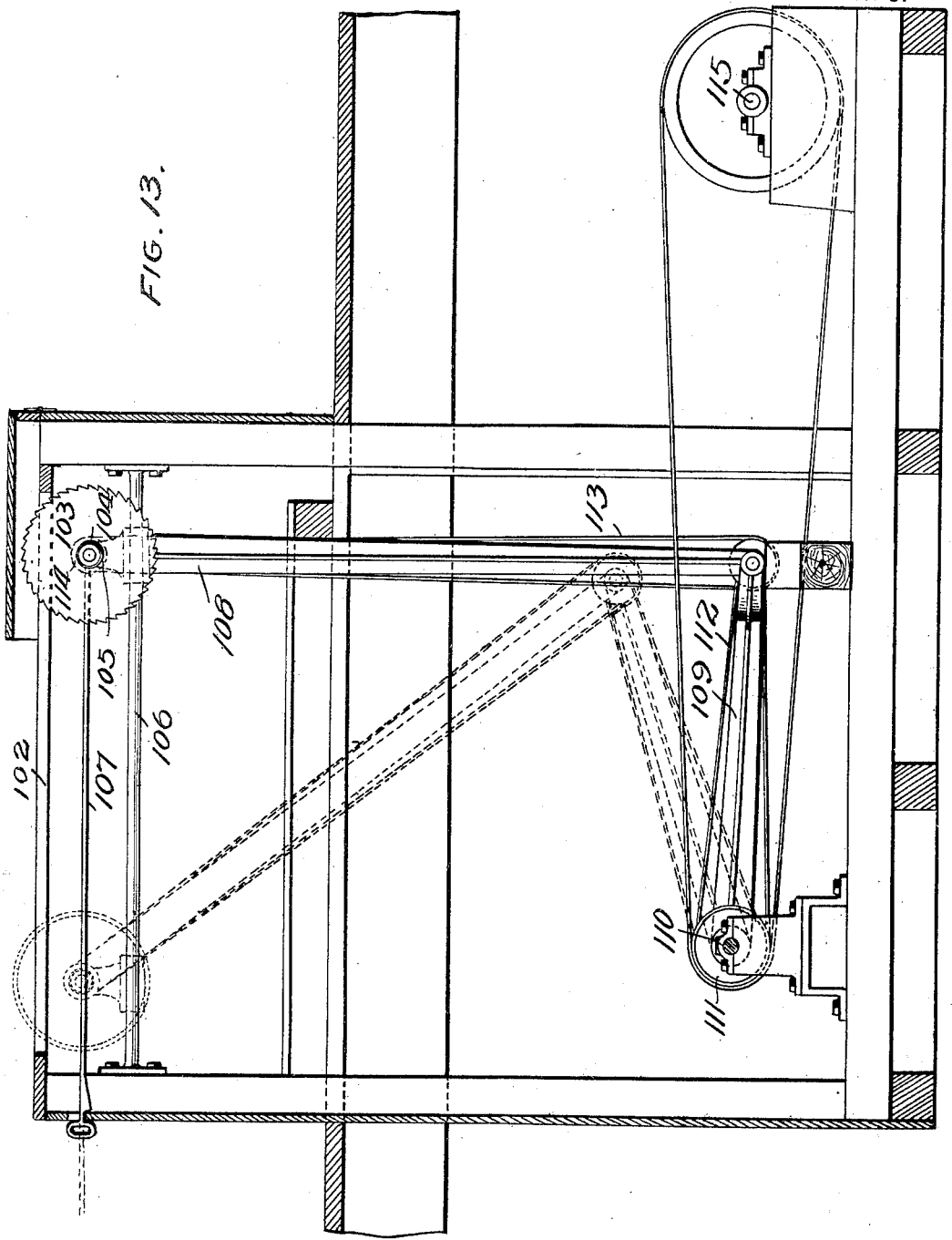

UNITED STATES PATENT OFFICE.

CHARLES J. JOHNSON AND WILLIAM H. SPRINGER, OF MINNEAPOLIS, MINNESOTA, ASSIGNORS, BY MESNE ASSIGNMENTS, TO NORTHWESTERN COMPO-BOARD COMPANY.

MACHINE FOR MANUFACTURING COMPO-BOARD.

SPECIFICATION forming part of Letters Patent No. 679,698, dated July 30, 1901.

Application filed October 22, 1897. Serial No. 655,996. (No model.)

*To all whom it may concern:*

Be it known that we, CHARLES J. JOHNSON and WILLIAM H. SPRINGER, of the city of Minneapolis, county of Hennepin, State of Minnesota, have invented a new and Improved Machine for Manufacturing Compo-Board, of which the following is a specification.

Our invention relates to a machine for manufacturing composition lumber of various forms, particularly that which is shown and described in Letters Patent issued to George S. Mayhew February 9, 1892, and numbered 468,355.

Our invention further relates to a machine comprising a single mechanism wherewith all steps of the process of manufacturing composition lumber are carried out.

The manufacture of "compo-board," by which arbitrary term the material described in the above-named Letters Patent is known to the public, embraces a somewhat intricate process, the steps of which may be outlined as follows: The thick cardboard is obtained in large rolls, and the strips taken from two such rolls are first trimmed and then covered on their inner surfaces only with a particular kind of glue. The narrow wooden slats which are to lie transversely between the paper strips are then inserted between the strips or sheets and there compressed between the sheets to drive out the surplus adhesive material and thoroughly impregnate the paper and the wooden slats therewith. We have found it impractical to press the sheet or board thus formed between continuously operating or advancing rolls, and hence it is necessary to stop the progress of the sheets long enough to press and partially dry the same, after which the pressed sheets are drawn forward to make room for newly-assembled portions and are then cut into regular lengths, which lengths do not often correspond with the length of the material which may be taken into the press at a single movement. The timing of the operation of the different parts and the coöperation of all of the parts becomes an important element of success in order that all parts may operate as one combined and perfect machine. It has been found impractical to produce the material by a step-by-step process in separate machines.

It is the object, therefore, of this invention to provide a single machine for the production of composition lumber, to make the same of the simplest possible construction, to place the machine under the control of not more than two men, and preferably one man, and to construct the parts and assemble them in such a manner that comparatively little space will be occupied. The ultimate end of the invention is to reduce the cost of composition lumber.

The invention will be more readily understood by reference to the accompanying drawings, forming part of this specification, and in which—

Figure 2:
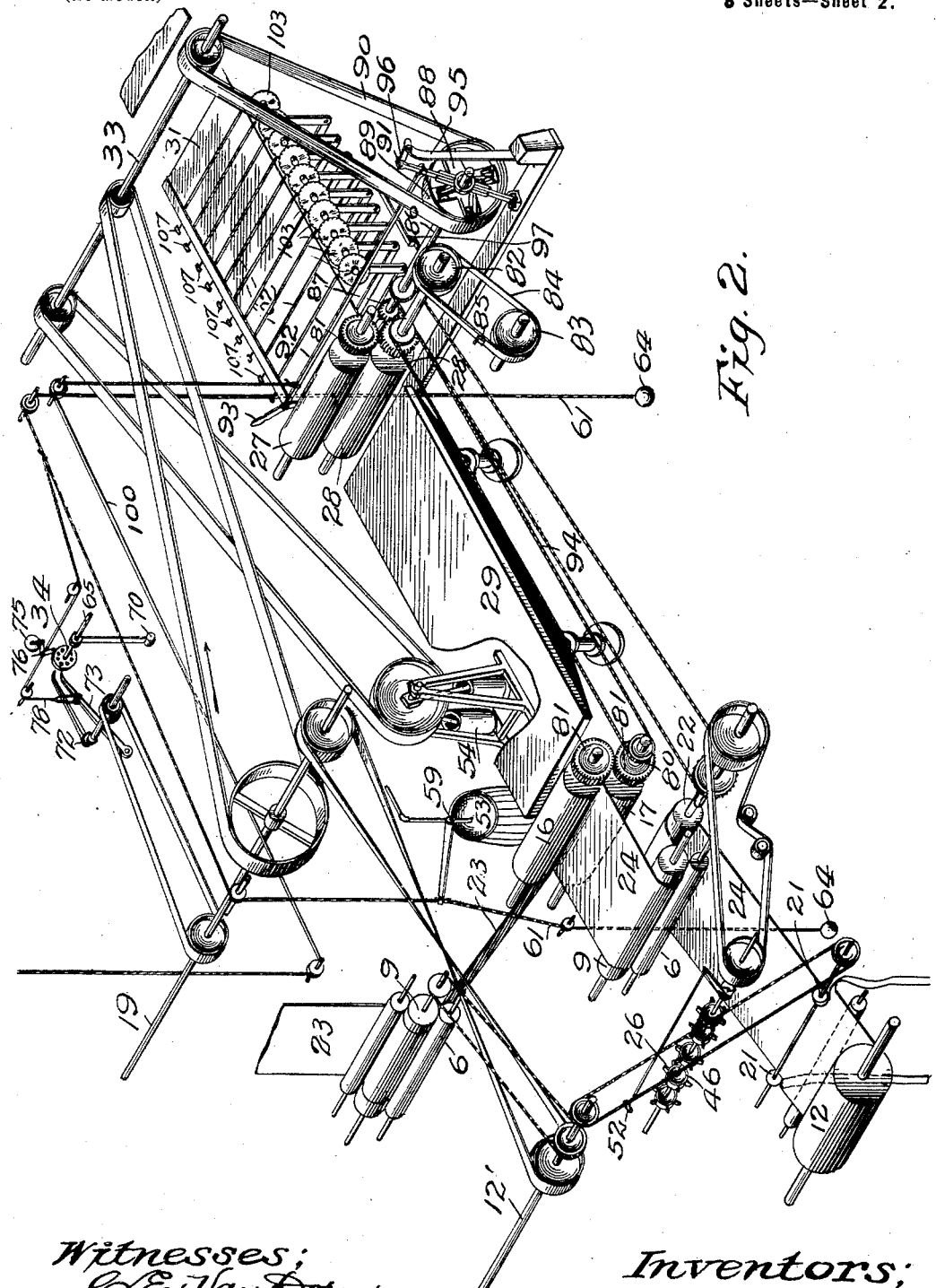
Figure 3:
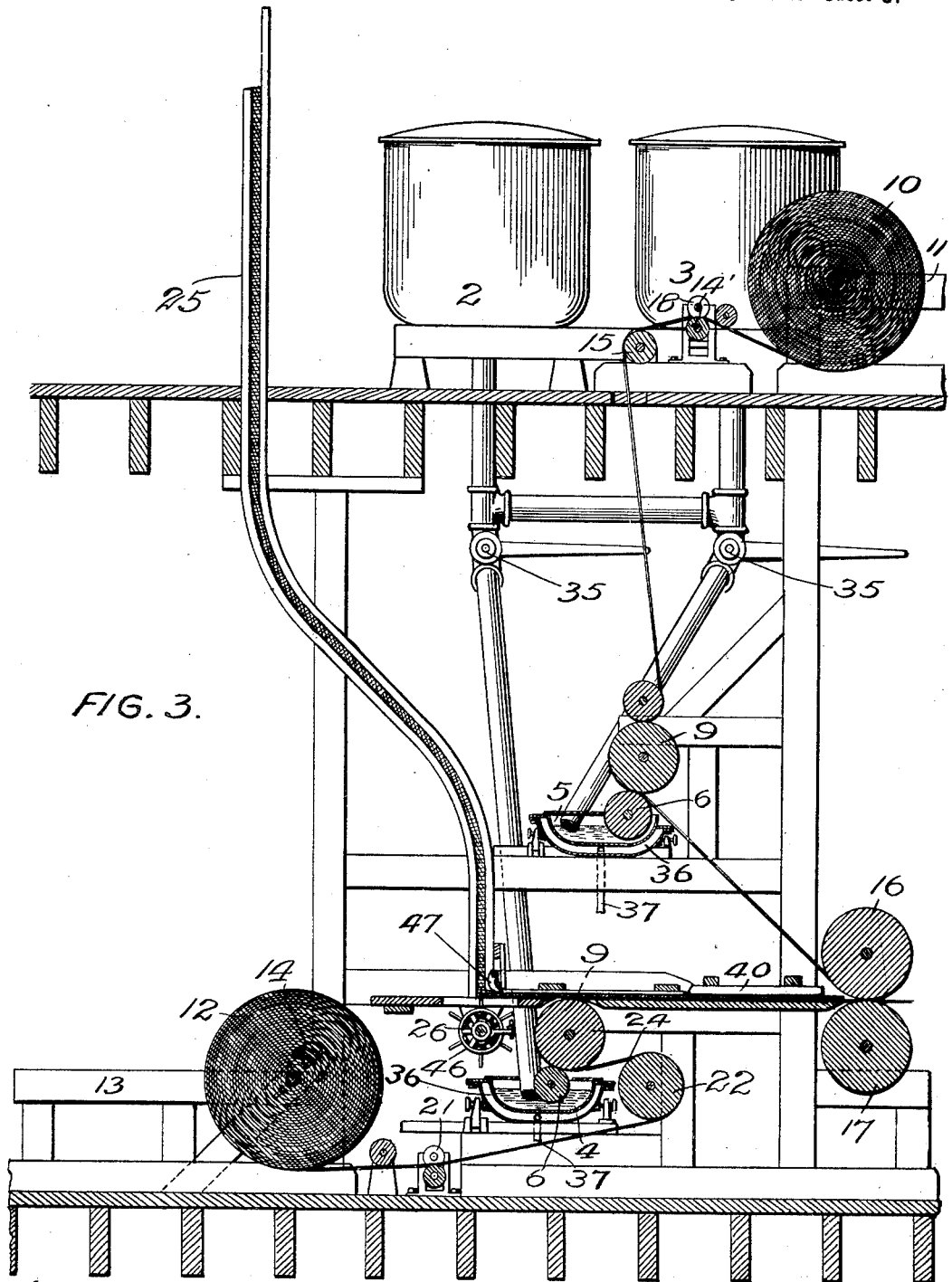
Figure 6:
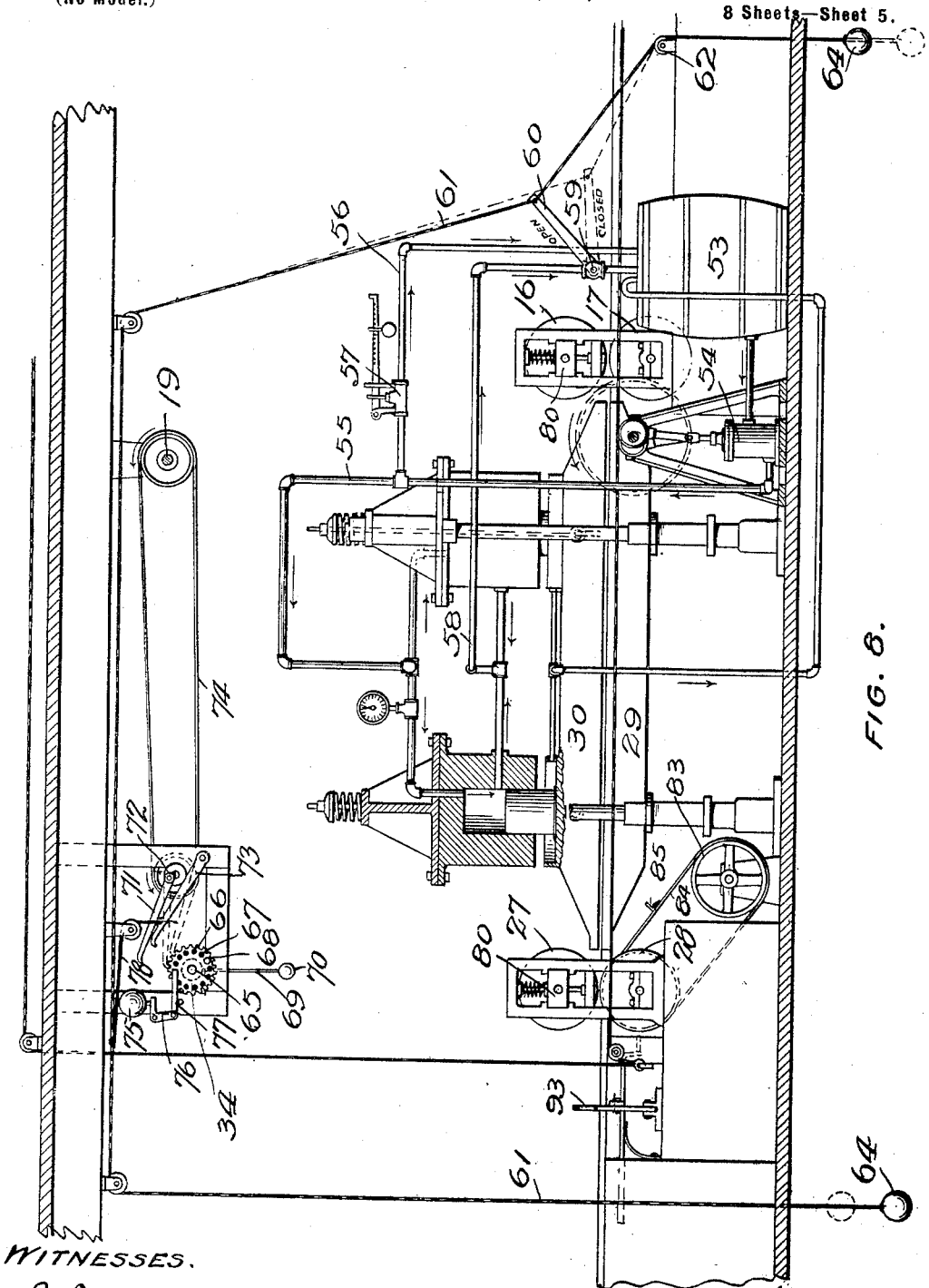
Figure 12:
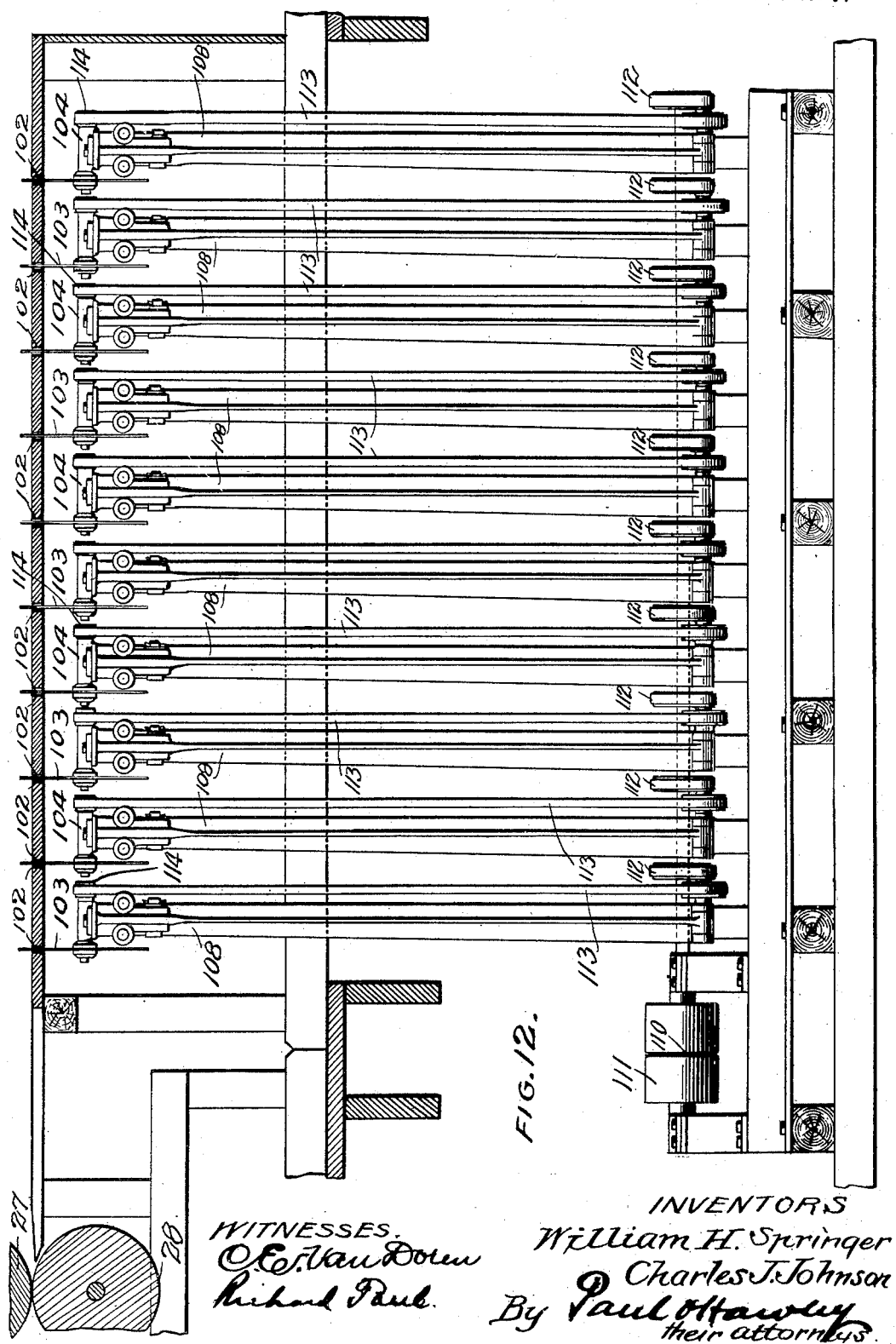

Figure 1 is a general vertical section of the machine embodying our invention. Fig. 2 is an isometric view showing the several moving parts of the mechanism. Fig. 3 is an enlarged vertical section of the assembling mechanism or part of the machine. Fig. 4 is a still further enlarged vertical and longitudinal section on line $y\ y$ of Fig. 5 of the lower part of the assembling mechanism, illustrating fully the manner in which the thick sheets of paper or cardboard enter the machine and the means for feeding the slats thereto. Fig. 5 is a transverse vertical section on the line $x\ x$ of Fig. 4 looking in the direction of the arrow A. Fig. 6 is a partial plan detail section upon the line $z\ z$ of Fig. 5. Fig. 7 is a sectional view of the product of the machine. Fig. 8 is a side elevation of the pressing mechanism and the means for controlling the action of both the assembling and pressing parts of the machine, taken on the side of the machine opposite to that of Fig. 1. Fig. 9 is an enlarged side elevation of the automatic regulating and trip device employed in connection with the assembling mechanism and the press portion of the machine. Fig. 10 is a transverse vertical section on the line $z\ z$ of Fig. 9 and looking in the direction of the arrow B. Fig. 11 is a detail view showing the auxiliary lever or trip adapted to be operated from various parts of the machine and whereby the machine may be stopped. Fig. 12 is an enlarged longitudinal and vertical section of the machine, showing the gang of transversely-operating saws or cutters; and Fig. 13 is a transverse vertical section thereof.

The invention consists generally in the combination of means to assemble the wide sheets or strips of paper or cardboard and the wooden slats and the interposed adhesive material of a mechanism coöperative therewith to press and at least partially dry the assembled portions, means for sawing or cutting the material so pressed and dried into desired lengths irrespective of the lengths of the portions coming from the other parts of the machine, and means connected with and connecting the above-mentioned parts of the machine for actuating and controlling and timing the relative actions of the said parts; and, further, the invention consists in detailed constructions and in combinations of parts, all as hereinafter described, and particularly pointed out in the claims.

Referring to Fig. 1, in which all of the main parts of the machine are indicated, while the details are omitted, 2 and 3 represent the tanks or vats in which the adhesive material, which is composed of glue and an earthy matter, is prepared and held to supply the paste-roll troughs 4 and 5, respectively. A roll 6 dips into each of these troughs and makes contact with a pressure and carrying roll 9, over which the strip of paper is carried. The supply-tanks are arranged upon one floor of the building, while the main operating parts of the machine are for the most part arranged on the floor beneath it. One roll 10 of paper is held upon a suitable support 11 upon the upper floor, while the other roll 12 has a support 13 upon the lower floor. Each of these supports is provided with a clamp-bearing 14, by which friction is maintained on the arbor which carries the roll to prevent the too-rapid unwinding of the paper strips. The strip of paper from the upper roll is carried from the under side thereof over rolls 14' and 15, and thence downwardly over the roll 9 and between the same and the pasting-roll 6 to the first set of drawing-rolls 16 17, between which the end of the strip is passed. The roll 6 is operated in a direction opposite to the movement of the paper strip to better deposit the paste on the paper. As the paper leaves the roll it passes under the rotating trimming-cutters 18, which operate in connection with the roll 14', but are preferably driven separately from the main drive-shaft 19. The other strip of paper is taken from the roll 12, carried through trimmers or cutters 21, thence upwardly around the idle roll 22 and beneath the roll 9, and thence forwardly over the top thereof and across a table (not shown in Fig. 1) to the drawing-rolls 16 17. The cutters 21 and the two paste-rolls 6 are driven from the main shaft 12. The slats to be placed between the two paper strips 23 and 24 from the rolls 10 and 12 are fed into the upper end of the slat-chute 25 and descend therein to a feed mechanism, (indicated by the wheel 26 in Fig. 1,) by which the slats are forced one by one upon the top of the sheet 24 between the rolls 9 and 17. As the sheet 24 is covered with adhesive material, the slats adhere slightly thereto and are carried along by the sheet and enter between the rolls 16 and 17 and are caught between the two sheets or strips of paper.

27 and 28 indicate the second set of drawing-rolls, which are set somewhat more closely together than the drawing-rolls 16 and 17 and are intermittently driven, as will be hereinafter described.

Between the two pairs of drawing-rolls we arrange the press mechanism, comprising the stationary bed-plate 29 and the movable pressure-plate 30, which latter is operated by any convenient means, controlled as described hereinafter. The assembled parts of the material in the crude form are carried between the two plates of the press by the tension or pull of the rolls 27 and 28. Then said rolls are stopped by the action of the intermittent driving mechanism, and the press is operated. Emerging from the rolls 27 and 28, the material passes upon the table 31, through which a gang of saws 32 operate. By the peculiar arrangement of the saws the sheet of material may be cut into desired lengths without regard to the length of material which may be pressed at a single operation.

33 represents the main counter-shaft of the machine, and 34 represents an automatic signal device, the operation of which will be explained later.

For explanation of the details and detailed operation of the machine reference is made to the other figures of the drawings.

In Fig. 3, 35 35 represent valves in the pipes, extending from the vats or tanks 2 3, by which the flow of material to the troughs 4 5 is regulated. The construction of these troughs is shown in Figs. 3, 4, and 5. Each comprises two vats or troughs with a steam-space 36 between the same, to which steam is supplied through a pipe 37. In this manner the glue is kept at the proper temperature at all times. The adjustment of the trough is provided for by the employment of the adjusting-screws 38, whereby the same may be shifted with respect to the roll to prevent the collection of heavy sediment in the bottom of the trough. The troughs are furthermore set on guides 39, so that the same may be easily slipped out of place when it is desired to clean or scrape the same.

As shown in Figs. 3 and 4, the table beneath the sheet 24 extends upon opposite sides of the roll 9, being provided with a slot through which the paper passes onto the top of the table. On the table is a heavy frame 40, which frame rides upon the tops of the slats that are on the paper 24 and is fixed against longitudinal movement in any suitable manner. This frame is removable in order that a broken slat or a crooked slat may be easily removed and replaced by another one upon the paper before the two sheets of paper are brought together between the drawing-rolls 16 17. This frame 40 has a stationary or permanent counterpart on the rear end of the table, and this portion 41 of the frame is provided with longitudinal guide-bars 42, which, as shown in Fig. 6, are adjustably held by brackets 43 and bolts 44. The slats 45 are fed between the bars 42 and the rear part of the table by a series of toothed wheels 46, operating directly beneath the lower end of the feed chute or spout 25. The teeth upon this wheel 46 strike the lower slat in the chute and move the same forward beneath the spring-pawls or pressure-fingers 47 and thence beneath the bars 42. The spring-pawls 47, of which there are several, force down the warped and crooked slats until they will enter beneath the bars 42. In the back of the chute 25 there are vertical bars 48, which are preferably adjustable, and the slats in the lower part of the chute are pressed firmly against these by the flat springs 49 to aline the slats, so that they will be as nearly as possible in exact position to be struck on one edge by all the teeth of the different wheels at the tops of the different wheels. As it is sometimes necessary to stop the feed mechanism—as, for instance, when the slats become choked in the chute—we preferably provide a clutch 50 upon the shaft 51, that carries the feed-wheels or knockers 46, and this clutch is arranged to be operated by a pull-rod 52, (shown in Fig. 5,) the same being upon the same side of the machine with the other clutch-controlling devices. As different thicknesses of slats are employed, both the bars 48 and the springs 49 are made vertically adjustable, these parts forming the lower end of the chute.

In Fig. 8 we have shown the detailed construction of the press and the means for controlling the action thereof. The drawing-rolls 16 17 and the second drawing-rolls 27 and 28 are shown arranged at opposite ends of the press. We preferably employ a hydraulic press, as the action thereof is regular and may be easily timed and controlled. 53 (see Fig. 8) represents a barrel or tank to contain oil that is taken therefrom by a pump 54, driven from the main counter-shaft 33, as shown in Fig. 2. From the pump-cylinder the oil is conducted to the press-cylinders through a pipe 55. 56 represents a return-pipe leading from the pipe 55 to the tank and containing a safety-valve 57, whereby the pressure used in the press is limited. This valve is adjustable. The oil is taken from the press-cylinders through the pipe 58, leading back to the tank and containing the relief-valve 59, which, if opened, allows the oil to escape freely from the cylinders, whereupon the movable plate of the press will rise, owing to the action of suitable springs. To the relief-valve lever 60 is connected the valve-rope 61, which extends therefrom downwardly over a pulley 62 and also upwardly over ceiling-pulleys, and thence downwardly at the rear end of the sawing-table. At both ends of the rope are weights 64 to keep the same taut and balanced.

The signal device or timing device 34 above referred to is shown clearly in Fig. 8 and comprises a loose shaft 65, free to turn in its bearings and carrying a toothed wheel 66, which wheel is provided with a number of holes 67, in any one of which a stop-pin 68 may be placed. A cord or strap 69, having a weight 70 in its free end, is attached to the shaft, so as to be wound thereon when the shaft is turned and to rotate the shaft backwardly when it is liberated. For operating the shaft in time with the operation of the press a pawl 71 and a crank 72 are employed, the pawl being adapted to engage and rotate the wheel 66 step by step. 73 is a stop-pawl to prevent the return of the wheel. The crank-shaft 72 is driven by a belt 74 from the main drive-shaft 19 or the counter-shaft. 75 represents a bell, and 76 the hammer therefor, adapted to be operated by the engagement of the stop-pin 68 and the thrust-bar 77, which latter is thrown back by the stop-pin. When the stop-pin passes the same, the hammer will fall back against the bell, whereupon the operator will draw down upon the valve-rope 61, thereby opening the relief-valve 59 and releasing the press. The rope 61 is connected with the two pawls 71 73 by a strand 78, so that said pawls are disengaged from the wheel 66 at the moment that the press is opened. They are held in this position until the operator draws up on the valve-rope 61, thereby allowing the weight 64, near the feed end of the press, to fall and close the valve 59 and again set the press in operation.

The upper drawing-rolls 16 27 are both mounted in spring-bearings 80, and the lower roll of each pair is positively driven. The rolls in each pair are connected by gear-wheels 81. On the shaft of the roll 28 is a belt-pulley 82, and 83 represents an idle pulley. 84 is a belt operating over the pulleys 82 and 83 and provided with lugs 85. The roll 28 is driven from the shaft 86, which is provided with a pinion 87, meshing with the gear on the shaft of the roll 28. On the shaft 86 is a clutch 88 to engage a loose pulley 89, which is driven by a belt 90 from the counter-shaft 33. The clutch may be thrown into engagement with the pulley by means of the lever 91 and the lever-operating rod 92, which rod is in turn operated by the lever 93. When the rod 92 is drawn forward, it is locked in said position by the spring 97, which "sets" in the notch 98 in the under side of the rod. At this time the forward drawing-rolls will be operated and the first set of drawing-rolls will be operated from the forward drawing-rolls through the sprocket-belt 94. To release the clutch at any desired time—as, for instance, when there is trouble at the feed-chute—we arrange the lever 99 to throw down the spring 97 and adapted to be operated from either end of the machine by means of the rope 100, which is under tension of the balanced weights 64 and the ends of which are within the reach of the operator at the sawing-table and the attendant who watches the slat-feed mechanism. To automatically throw down the spring and release the clutch after a certain number of feet of material have been drawn from the press, the lugs 85 upon the belt 84 engage the end of the spring 97, as shown in Fig. 9. At any time when the rod 92 is released from the spring 97 it is instantly drawn back, and the clutch is released by the action of the strong spring 95, connected with the clutch-lever 91 by a short link 96, thereby instantly stopping the drawing-rolls. At this instant the operator pulls up on the taut valve-rope 61 and sets the press into action by pulling down the relief-valve lever 60.

The saw-table is an important feature of the invention, inasmuch as the press is of a given length, while it is necessary to cut the pieces of composition material into different lengths, as required for the market or by the formation of or imperfections in the board. The saw-table and gang of saws are best illustrated in Figs. 12 and 13, taken in connection with Fig. 1. The table is provided with transverse slots 102, in which the saws 103 move. The board or strip of material coming from the rolls 27 28 is of such a width that a saw upon the single swinging arm cannot be employed advantageously because of the arc it describes. Therefore the saws are provided upon short arbors 104, arranged in blocks 105, which are slidable upon horizontal transverse guide-rods 106, whereby the saw is held at all times at a fixed distance with respect to the saw-table. The blocks and the saws are drawn across the table by means of rods 107, one of which is connected with each saw-block 105.

108 represents a vertical arm, which at its upper end is pivoted on a short arbor 104 and has its lower end pivoted in the end of the horizontal arm 109, which latter arm is pivoted on the drive-shaft 110. On the drive-shaft 110 is a pulley 111, and from this a belt 112 extends to a pulley rotating about a pivotal center common to the arms 108 and 109. From the same pulley a belt 113 extends upwardly around a small pulley 114 on the arbor 104, whereby the saw is driven at a high speed. This arrangement is duplicated in connection with each saw, and the drive-shaft 110, which bears all of the pulleys 111, is driven from a parallel shaft 115, arranged beneath the lower floor of the building. When a saw is drawn forward by means of the rod 107, the arm carrying it will have changed its angle, as indicated by dotted lines in Fig. 13; but the lengths of the belts 112 and 113 will not be varied.

The saws are arranged at given distances apart, there being preferably one foot between each. There is a space of several feet between the drawing-rolls 27 28 and the first saw. Supposing that this space is four feet, while the press is ten feet in length, then the first piece of material coming from the press would project six feet upon the saw-table. The board varies from three and one-half to five feet in width, according to the size of the machine, and obviously a piece six feet long would be too small for shipment. Hence it is necessary to wait until the next operation of the press before cutting the board. When the drawing-rolls are next operated, another ten feet of board will be projected upon the table, making sixteen feet in all on the table, and the board would be cut with the first saw, while if a board fifteen feet in length was wanted the strip would be cut by drawing forward the second saw, and so on, the required saw being operated in the interval during which the press is acting and after the drawing-rolls have been stopped. Supposing that the first saw had been operated, as described, and it is desired to cut the material into six-ten-foot lengths, there would be four feet of finished material left upon the saw-table, and to this would be added ten feet next taken from the press, making only ten feet exposed beyond the first saw. With ten feet of board on the table it will be necessary to wait for a further operation of the press before the sixteen-foot board could be obtained, and thus would leave twenty feet of board exposed beyond the first saw. To cut a sixteen-foot board after this, the fifth saw would be operated. This would leave eight feet of board in front of the drawing-rolls and four feet in front of the first saw. Two operations of the press would be required to get sufficient material to cut another sixteen-foot length, and at the end of these two operations there would be a twenty-four-foot strip beyond the first saw, so that it would be necessary to operate the ninth saw of the gang to cut a sixteen-foot board. Following this with eight feet left on the table in front of the first saw and the next operation of the press bringing out ten feet more, the third saw would be operated to cut the next sixteen-foot board. Carrying forward the calculations with respect to any given length of cut, it will be seen that each one of the gang of saws will at some time necessarily be brought into play.

The operation of the machine will be understood from the foregoing without any further description thereof. Our invention admits of various modifications, which will readily suggest themselves to one skilled in the art, and we therefore do not confine the same to the specific constructions herein shown and described.

Having thus described our invention, we claim as new and desire to secure by Letters Patent—

1. In a machine for manufacturing compoboards, the combination of mechanism for supplying sheets or strips of paper in opposed relation, feeding mechanism acting to positively move and insert slats separately and individually between said sheets or strips of paper, a pressing mechanism acting periodically to press determined lengths of the assembled material, drawing mechanism at each end of the pressing mechanism, a cutting mechanism to cut the pressed material into lengths after being delivered by the drawing mechanism, and means acting to automatically stop the drawing mechanism during the operation of the pressing mechanism.

2. In a machine for manufacturing compoboards, the combination of means for delivering sheets or strips of paper, power-driven mechanism feeding or moving separate slats individually and in succession transversely between said sheets or strips of paper, assembling and pasting mechanism bringing together the slats and paper, a pressing mechanism periodically operating to compress the assembled parts, a drawing mechanism for the material to move the same during the period of inaction of the pressing mechanism, and automatic means for stopping the drawing mechanism during the period of operation of the pressing mechanism.

3. In a machine for manufacturing compoboards, the combination of means for delivering sheets or strips of paper, power-driven mechanism feeding or moving separate slats individually and in succession transversely between said sheets or strips of paper, assembling and pasting mechanism bringing together the slats and paper, a pressing mechanism periodically operating to compress the assembled parts, a drawing mechanism for the material to move the same during the period of inaction of the pressing mechanism, and automatic means for stopping both the drawing mechanism and assembling mechanism during the period of operation of the pressing mechanism, and a sawing or cutting mechanism operable during the operation of the pressing mechanism for cutting the material into desired lengths.

4. In a machine for manufacturing compoboards, the combination of mechanism for feeding sheets or strips of paper, power-driven means positively delivering separate slats individually and successively transversely between said sheets or strips of paper, a plate-pressing mechanism, means for operating said mechanism periodically to press separate lengths of the assembled material, and a sawing mechanism comprising a series of saws independently movable transversely across the path of the material to cut the same into various lengths during the operation of the pressing mechanism irrespective of the periodical output of said pressing mechanism.

5. In a machine for manufacturing compoboards, the combination of an assembling and pasting mechanism to deliver pasted sheets of paper in opposed relation, mechanism for positively moving individual slats transversely between said sheets of paper, a pressing mechanism and a drawing mechanism, means for controlling the operative relations of said mechanism, a cutting mechanism comprising a number of independent transversely-movable cutters, and means for causing any one of said cutters to act upon the material as it is furnished in determined pressed lengths, to cut the same into varying lengths.

6. In a machine for manufacturing compoboards, the combination of means for feeding sheets or strips of paper, driven supplying mechanism for positively moving individual slats between said sheets or strips, assembling means, means under control of the operator for timing the delivery of the paper and slats to the assembling means, a pressing mechanism and devices in operative connection with said means and mechanism for controlling the relative action thereof.

7. The combination, in a machine for manufacturing compo-board, of the assembling mechanism, with the driven automatic delivery or supply mechanism for the paper, slats and glue, means for controlling the actions of said delivery and said assembling mechanisms, a pressing member, drawing means, automatic means for controlling the operation of said drawing means and said assembling mechanism, and further means common to the assembling mechanism and said pressing member, and controlling said drawing means, substantially as described.

8. In a machine for manufacturing compoboards, the combination of an assembling mechanism, an intermittently-operating pressing mechanism adjacent thereto, a sawing-table disposed adjacent the pressing mechanism and provided with saws arranged at different distances from said pressing mechanism, and means to move any one of said saws across the table transversely to the line of movement of the material as it comes from the pressing mechanism and drawing devices for drawing a certain quantity of material from the press and passing it onto the sawing-table during the period of inaction of the pressing mechanism.

9. The combination, with a press of a certain length, of a gang of independently-operative saws arranged at different distances from said press, means for operating said saws, and means for drawing a given amount of material from said press at a time, to be cut into desired lengths, substantially as described.

10. In a machine for manufacturing compoboards, the combination of a pressing mechanism, feeding devices adjacent thereto to feed the material to the pressing mechanism, drawing mechanism, a cutting mechanism and an automatic stopping mechanism acting to stop the drawing mechanism during the action of the press and cutting mechanisms.

11. In a machine for making compo-board, the combination, of a driven paper and slat assembling and pasting mechanism, with the intermittently-operable press, drawing-rolls, said assembling mechanism and said rolls being capable of continuous operation, and driving means therefor controlled by the operation of said press, substantially as described.

12. In a machine for making compo-board, the combination, of a driven paper and slat assembling and pasting mechanism, with the intermittently-operable press, drawing-rolls, said assembling mechanism and said rolls being capable of continuous operation, driving means therefor controlled by the operation of said press, the gang of transversely-operable saws, said saws being arranged at varying distances from the said press and automatic means determining the number of rotations of said drawing-rolls for each operation of the press, substantially as described.

In testimony whereof we have hereunto set our hands this 24th day of September, A. D. 1897.

CHARLES J. JOHNSON.
WILLIAM H. SPRINGER.

In presence of—
C. G. HAWLEY,
A. F. HOLMES.